(12) United States Patent
Uneme

(10) Patent No.: US 11,705,775 B2
(45) Date of Patent: Jul. 18, 2023

(54) ELECTRIC APPARATUS

(71) Applicant: Honda Motor Co., Ltd., Tokyo (JP)

(72) Inventor: Takahiro Uneme, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 17/503,374

(22) Filed: Oct. 18, 2021

(65) Prior Publication Data

US 2022/0190675 A1   Jun. 16, 2022

(30) Foreign Application Priority Data

Dec. 14, 2020 (JP) ................................. 2020-206626

(51) Int. Cl.
| | |
|---|---|
| *H02K 5/22* | (2006.01) |
| *H01R 25/00* | (2006.01) |
| *H02K 11/30* | (2016.01) |
| *H02P 27/06* | (2006.01) |
| *H01R 9/24* | (2006.01) |

(52) U.S. Cl.
CPC ........... *H02K 5/225* (2013.01); *H01R 9/2491* (2013.01); *H01R 25/006* (2013.01); *H02K 11/30* (2016.01); *H02P 27/06* (2013.01); *H01R 2201/10* (2013.01)

(58) Field of Classification Search
CPC .............. H01R 2201/10; H01R 25/006; H01R 9/2491; H02K 11/30; H02K 5/225; H02P 27/06
See application file for complete search history.

(56) References Cited

U.S. PATENT DOCUMENTS

| 2018/0170188 A1* | 6/2018 | Uneme | .................. | B60L 53/22 |
| 2022/0190676 A1* | 6/2022 | Ishii | ...................... | H02K 5/225 |

FOREIGN PATENT DOCUMENTS

| JP | 2004082940 A | * | 3/2004 |
| JP | 5692003 | | 4/2015 |
| JP | 5692003 B2 | * | 4/2015 |

OTHER PUBLICATIONS

JP-5692003-B2, Baba, All pages (Year: 2015).*
JP-2004082940-A, Habara, All pages (Year: 2004).*

* cited by examiner

*Primary Examiner* — Naishadh N Desai
(74) *Attorney, Agent, or Firm* — JCIPRNET

(57) ABSTRACT

An electric apparatus including a connector holding six connecting terminals is provided. Three one-side connecting terminals held by the connector are arranged side by side in a row substantially directly below conductive terminals of three phases of one DC-AC converter. Three another-side connecting terminals held by the connector are arranged side by side in a row at positions offset to a side away from the one-side connecting terminals in an axial direction. Upper-end side connecting parts of the three one-side connecting terminals are set to be lower than upper-end side connecting parts of the three another-side connecting terminals, and are connected to the corresponding conductive terminals above via busbars extending in an up-down direction. The upper end-side connecting parts of the three another-side connecting terminals are connected to corresponding conductive terminals via busbars extending along an arrangement direction of the conductive terminals.

2 Claims, 7 Drawing Sheets

ELECTRIC APPARATUS

CROSS-REFERENCE TO RELATED APPLICATION

This application claims the priority benefit of Japan application serial no. 2020-206626, filed on Dec. 14, 2020. The entirety of the above-mentioned patent application is hereby incorporated by reference herein and made a part of this specification.

BACKGROUND

Technical Field

The disclosure relates to an electric apparatus including an electric machine unit and a power drive unit.

Description of Related Art

Many hybrid vehicles and electric vehicles include an electric apparatus in which a power drive unit (PDU) is connected to an upper part of a rotating electric machine unit that houses a motor and a generator (i.e., two rotating electric machines) for driving. The power drive unit of the electric apparatus converts the DC power of a battery into a high-voltage AC power suitable for driving of the motor, and converts the AC power generated by the motor or the generator into a DC power and lowers the voltage to a predetermined voltage to charge the battery. Energizing parts of three phases of the motor (i.e., one of the rotating electric machines) are connected to corresponding conductive passages in the power drive unit via a connector having three connecting terminals. Further, energizing parts of three phases of the generator (i.e., another of the rotating electric machines) are similarly connected to corresponding conductive passages in the power drive unit via another connector having three connecting terminals.

However, in the case of a structure in which the two rotating electric machines are respectively connected to the conductive passages on the power drive unit side via separate connectors, two types of connectors are required, which is likely to cause a rise in product costs due to an increase in the number of components.

As an electric apparatus that can address this situation, it has been devised that the three connecting terminals connected to the one of the rotating electric machines and the three connecting terminals connected to the another of the rotating electric machines are arranged side by side in a row and held by one connector (see, for example, Patent Document 1: Japanese Patent No. 5692003).

However, since the electric apparatus described in Patent Document 1 uses a connector that holds six connecting terminals side by side in a row, for example, when the connector is arranged above the one of the rotating electric machines which is large in a manner that a one-end part of each of the connecting terminals is oriented downward, in order to prevent the connector from interfering with the rotating electric machine, the arrangement position of the connector cannot be lowered beyond a certain level.

Also, as a countermeasure, when three connecting terminals connected to the one of the rotating electric machines and three other connecting terminals connected to the another of the rotating electric machines are offset in a direction along the axial direction of the rotating electric machine and are arranged in two stages, the connector protrudes to one end side in the axial direction of the rotating electric machine with respect to the DC-AC converter of the power drive unit. Therefore, in either case, the outer shape of the electric apparatus becomes large.

SUMMARY

An electric apparatus according to the disclosure adopts the following configuration. Namely, the electric apparatus according to an embodiment of the disclosure includes a rotating electric machine unit (e.g., a rotating electric machine unit 11 of the embodiment), a power drive unit (e.g., a power drive unit 16 of the embodiment), three one-side connecting terminals (e.g., a fourth connecting terminal 19$d$, a fifth connecting terminal 19$e$, and a sixth connecting terminal 19$f$ of the embodiment), three another-side connecting terminals (e.g., a first connecting terminal 19$a$, a second connecting terminal 19$b$, and a third connecting terminal 19$c$ of the embodiment), and a connector (e.g., a connector 17 of the embodiment). In the rotating electric machine unit, two rotating electric machines (e.g., a motor 14 and a generator 15 of the embodiment) having energizing parts of three phases are housed in a casing (e.g., a casing 13 of the embodiment). The power drive unit has DC-AC converters (e.g., DC-AC converters 30A and 30B of the embodiment) of two systems corresponding to the two rotating electric machines and is connected to an upper part of the casing. The three one-side connecting terminals conduct the energizing parts of the three phases of one of the rotating electric machines with corresponding conductive terminals (e.g., conductive terminals 31$d$, 31$e$, and 31$f$ of the embodiment) of one of the DC-AC converters. The three another-side connecting terminals conduct the energizing parts of the three phases of another of the rotating electric machines with corresponding conductive terminals (e.g., conductive terminals 31$a$, 31$b$, and 31$c$ of the embodiment) of another of the DC-AC converters. The connector holds the one-side connecting terminals and the another-side connecting terminals and is attached to the upper part of the casing, and the conductive terminals of three phases of the one of the DC-AC converters and the conductive terminals of three phases of the another of the DC-AC converters are arranged side by side in a row in a direction intersecting an axial direction of the rotating electric machines. The three one-side connecting terminals held by the connector are arranged side by side in a row at positions substantially directly below the conductive terminals of the three phases of the one of the DC-AC converters. The three another-side connecting terminals held by the connector are arranged side by side in a row at positions offset to a side away from the one-side connecting terminals in the axial direction. Upper-end side connecting parts (e.g., floating terminal pieces 36 of the embodiment) of the three one-side connecting terminals are set to be lower than upper-end side connecting parts of the three another-side connecting terminals, and are connected to the corresponding conductive terminals above via busbars (e.g., busbars 32$d$, 32$e$, and 32$f$ of the embodiment) that extend in an up-down direction. The upper-end side connecting parts of the three another-side connecting terminals are connected to the corresponding conductive terminals via busbars (e.g., busbars 32$a$, 32$b$, and 32$c$ of the embodiment) that extend along an arrangement direction of the conductive terminals.

With the above configuration, the three another-side connecting terminals of the connector are arranged to offset in the axial direction with respect to the three one-side connecting terminals. Accordingly, since the connector does not become long in one direction, the arrangement position of the connector can be sufficiently lowered while avoiding interference between the connector and the rotating electric machine.

In addition, the upper-end side connecting parts of the three one-side connecting terminals are set to be lower than the upper-end side connecting parts of the three another-side connecting terminals, and are connected to the corresponding conductive terminals substantially directly above via the busbars that extend in the up-down direction. Therefore, it is possible to prevent the connector from protruding to one end side in the axial direction with respect to the DC-AC converter of the power drive unit.

Lower-end side connecting parts (e.g., lower-end regions 35e of the embodiment) of the three one-side connecting terminals may protrude further downward than lower-end side connecting parts (e.g., lower-end regions 35e of the embodiment) of the three another-side connecting terminals, and connection holes (e.g., connection holes 37 of the embodiment) facing a same direction may be formed at the respective lower-end side connecting parts of the one-side connecting terminals and the another-side connecting terminals.

In this case, when viewed from the axial direction, the lower-end side connecting parts of the connecting terminals on the front side can be arranged so as not to overlap with the connection holes of the connecting terminals on the back side. Therefore, the wiring connection operation to the lower-end side connecting parts can be easily performed from the same direction.

DESCRIPTION OF THE EMBODIMENTS

Figure 1:
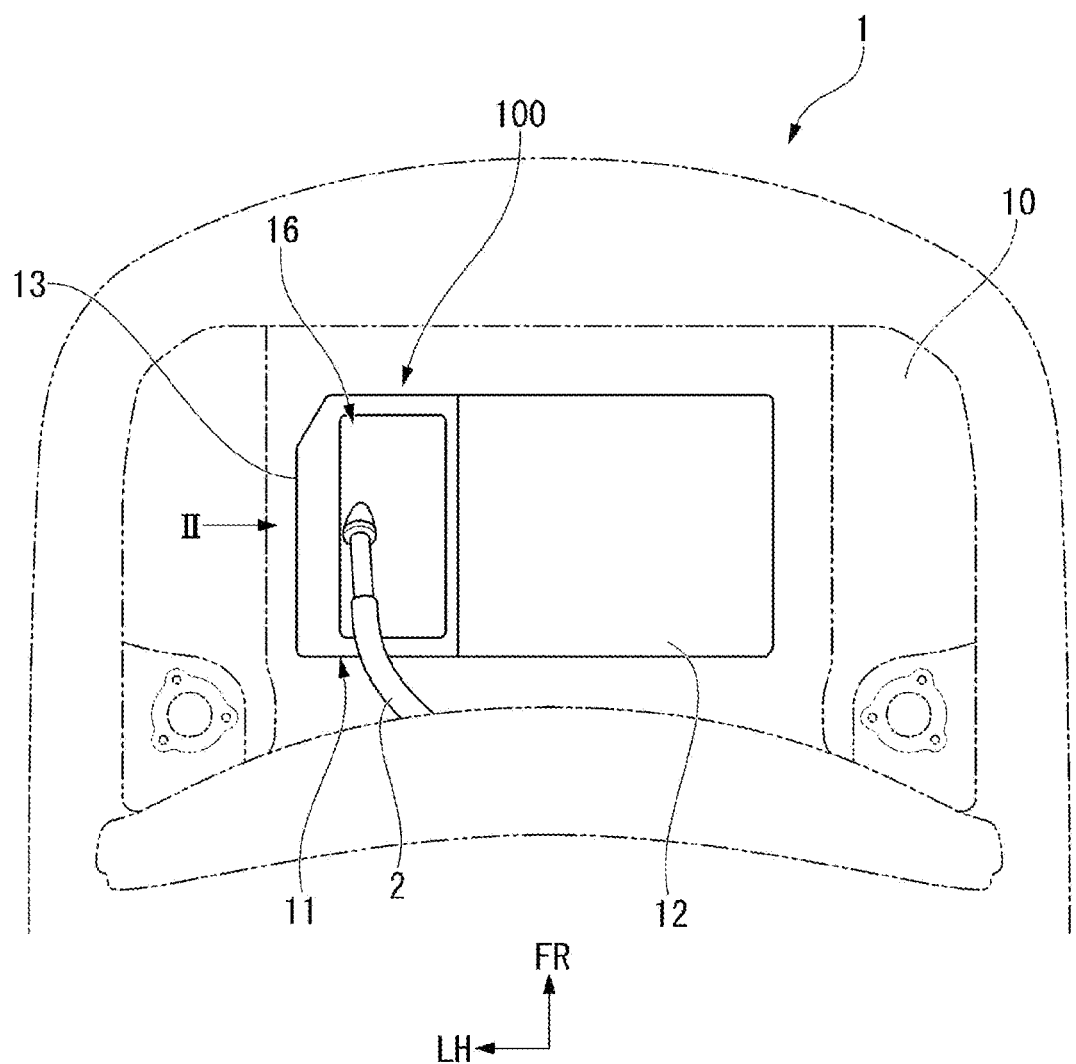
FIG. 1 is a plan view showing arrangements of components in an engine room of a vehicle of the embodiment.

The disclosure provides an electric apparatus capable of miniaturizing an outer shape by enabling compactly arranging a connector holding six connecting terminals.

According to the disclosure, since part of the connector can be arranged substantially directly below the conductive terminals of the three phases of the DC-AC converter while the length of the connector is reduced, the arrangement position of the connector can be sufficiently lowered, and the connector can be prevented from protruding to one side in the axial direction. Therefore, when the disclosure is adopted, the outer shape of the electric apparatus can be miniaturized.

Hereinafter, an embodiment of the disclosure will be described with reference to the drawings. In addition, an arrow FR pointing to a front side of a vehicle, an arrow UP pointing to an upper side of the vehicle, and an arrow LH pointing to a left side of the vehicle are labeled at appropriate positions in the drawings.

Figure 2:
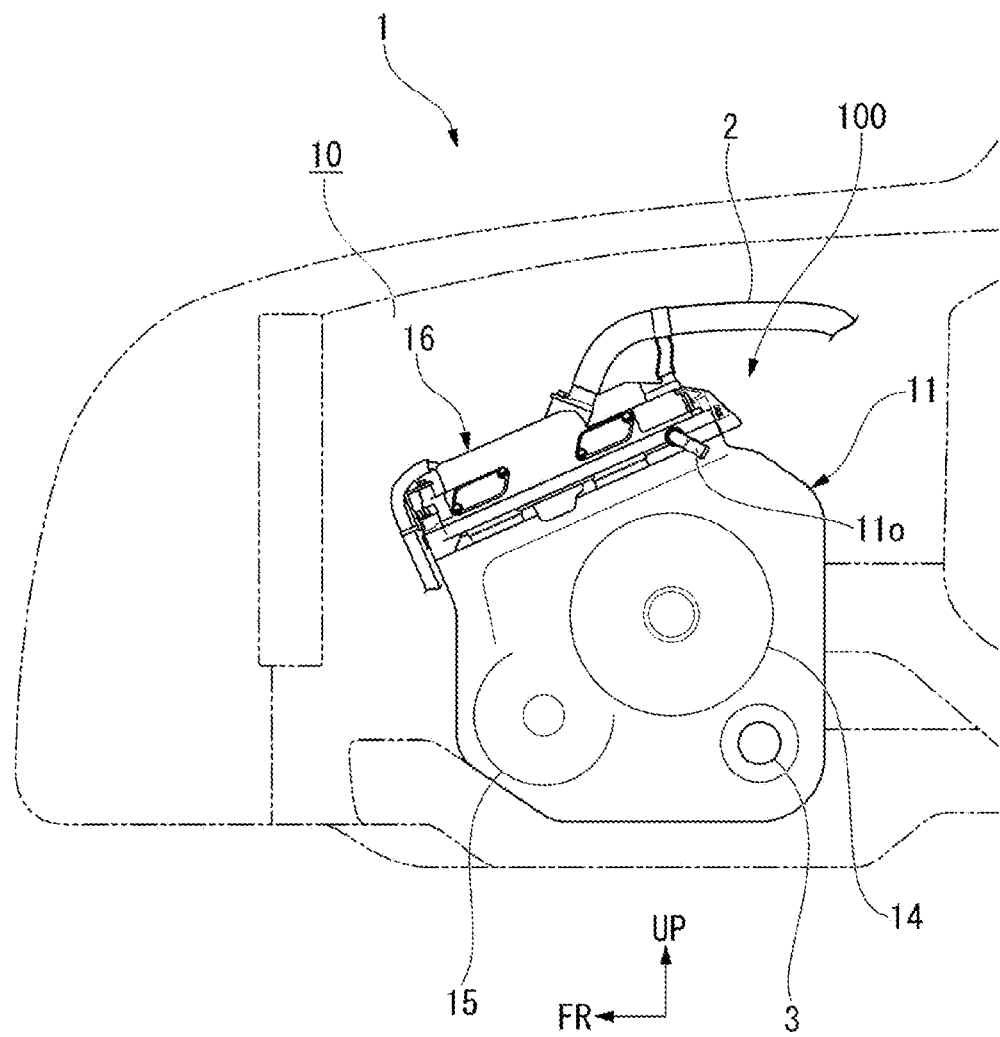
FIG. 2 is a schematic side view corresponding to an arrow II of FIG. 1 of the vehicle of the embodiment.

FIG. 1 is a plan view showing arrangements of components in an engine room 10 of a vehicle 1 of the embodiment, and FIG. 2 is a schematic side view corresponding to an arrow II of FIG. 1 of the vehicle 1.

The vehicle 1 of this embodiment is a hybrid vehicle including an engine 12 and a motor 14. A rotating electric machine unit 11 and the engine 12 are arranged in the engine room 10. The rotating electric machine unit 11 is integrally assembled to an end part of the engine 12 on an outer side in a vehicle width direction. In the rotating electric machine unit 11, the motor 14 and a generator 15 (i.e., two rotating electric machines) for driving the vehicle are housed inside a casing 13. A power drive unit (PDU) 16 is attached to an upper part of the casing 13 of the rotating electric machine unit 11. The power drive unit 16 boosts the DC power of a high-voltage battery (not shown; hereinafter referred to as a "battery") mounted on the vehicle 1 to a predetermined voltage and converts it into an AC power suitable for driving of the motor 14. Further, the power drive unit 16 converts the AC power regenerated by the motor 14 and the AC power generated by the generator 15 into a DC power, and lowers the voltage to a predetermined voltage to charge the battery.

Reference numeral 2 in FIG. 1 and FIG. 2 indicates a power supply cable that connects the power drive unit 16 and the battery (not shown), and reference numeral 3 indicates an output shaft that outputs the rotations of the motor 14 and the engine 12 to driving wheels (not shown).

An assembly of the rotating electric machine unit 11 and the power drive unit 16 constitutes an electric apparatus 100 in this embodiment. The motor 14 and the generator 15 in the casing 13 of the rotating electric machine unit 11 are electrically connected to the power drive unit 16 via energization paths of different systems. In the energization paths of two systems, a rotating electric machine unit 11 side and a power drive unit 16 side are connected via a plurality (six) of connecting terminals held by a connector 17 to be described later.

Figure 3:
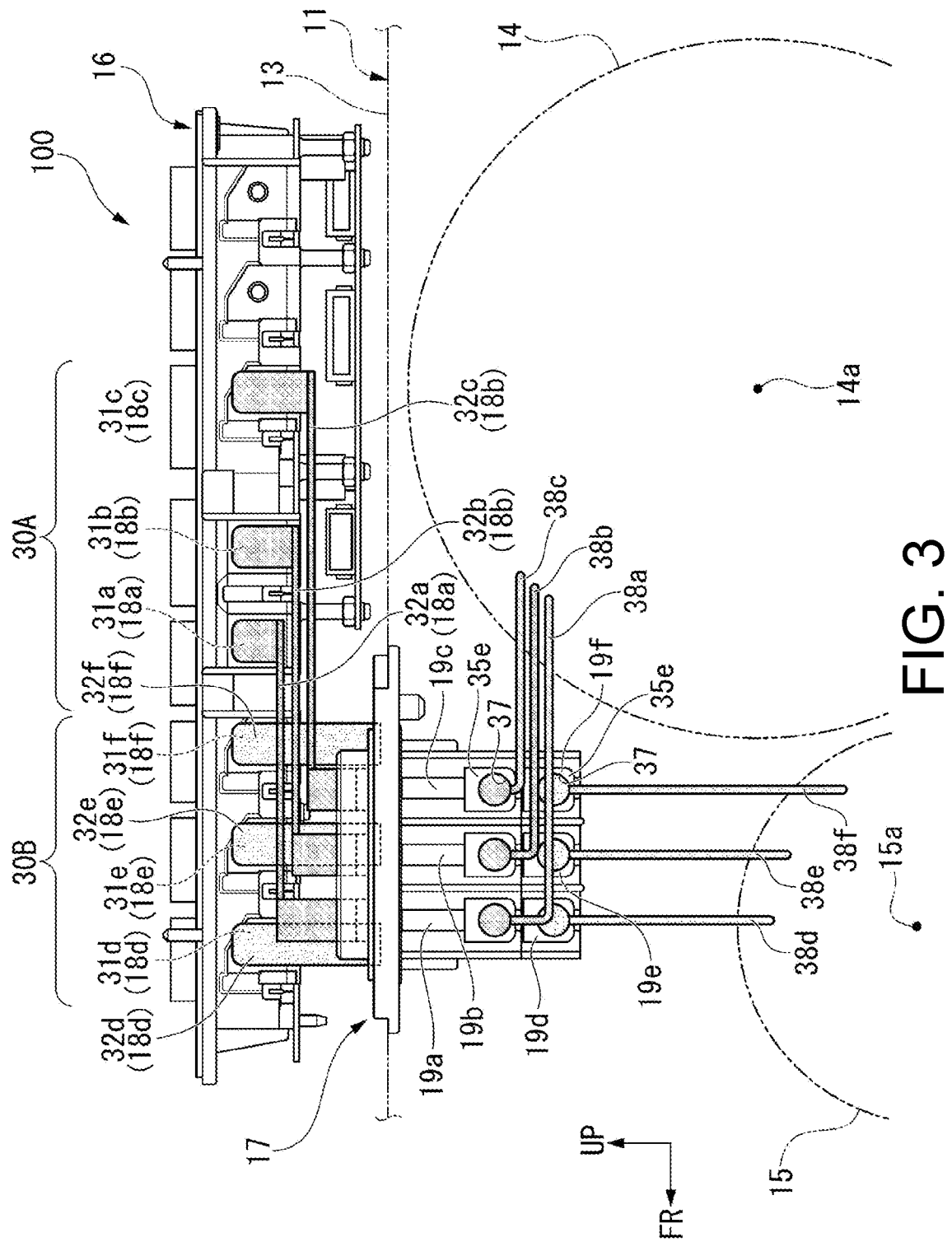
FIG. 3 is a side view showing an arrangement of a power drive unit, a connector, and two rotating electric machines in an electric apparatus of the embodiment.
Figure 4:
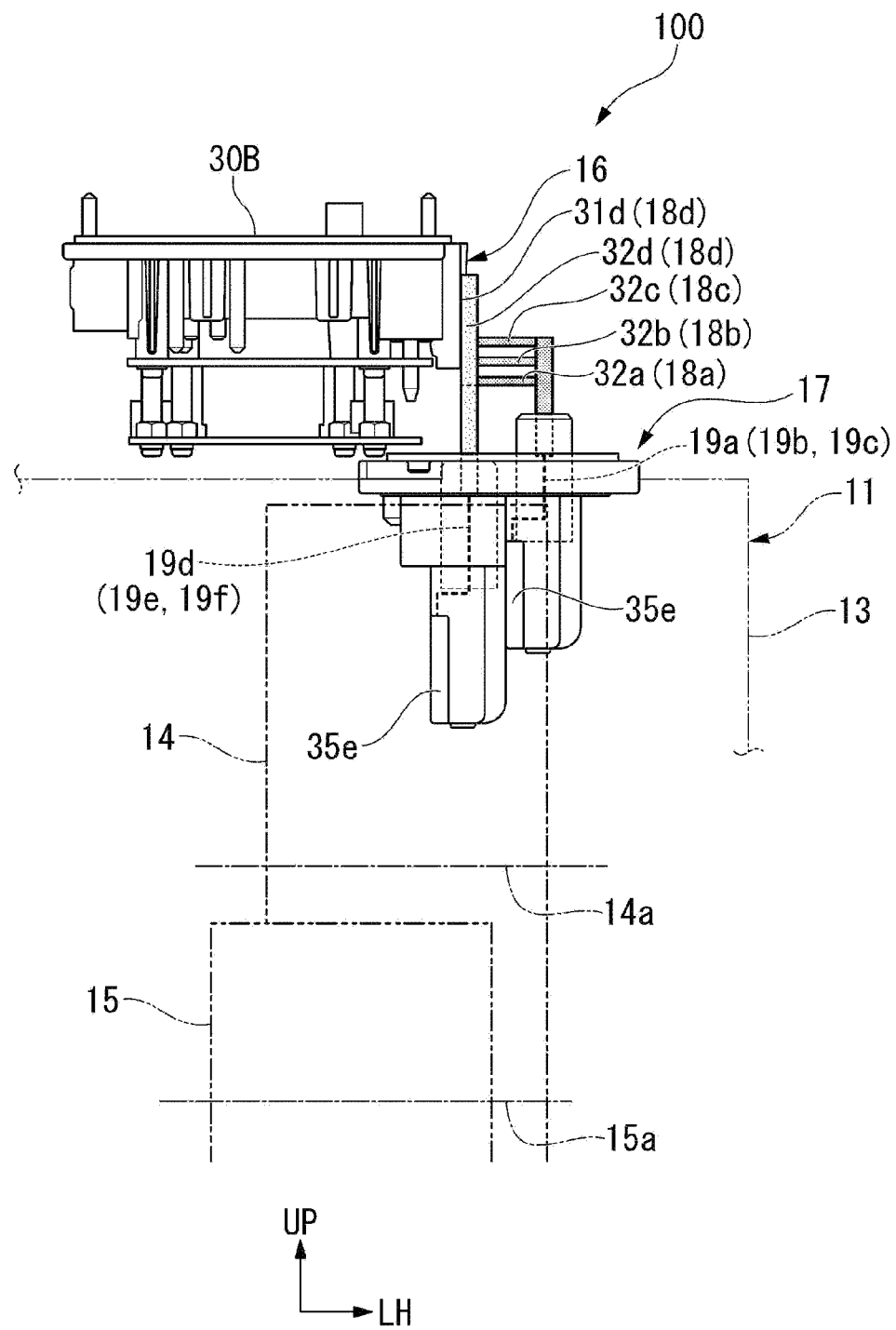
FIG. 4 is a front view showing the arrangement of the power drive unit, the connector, and the two rotating electric machines in the electric apparatus of the embodiment.

FIG. 3 and FIG. 4 are a side view and a front view showing the arrangement of the power drive unit 16, the connector 17, the motor 14, and the generator 15 in the electric apparatus 100.

The motor 14 for driving, which is a large component, is arranged substantially at the center, near the upper part in the casing 13 in the side view of the rotating electric machine unit 11. The generator 15 is arranged at a position below a front portion of the motor 14 in the casing 13, and the output shaft 3 (see FIG. 2) is arranged at a position below a rear portion of the motor 14 in the casing 13.

Further, as shown in FIG. 4, the motor 14 is arranged at a position toward the outer side in the vehicle width direction of the casing 13, and the generator 15 is arranged to extend more inward in the vehicle width direction than the motor 14.

The motor 14 and the generator 15 are arranged in the casing 13 in a manner that their rotation center axes 14a and 15a are oriented toward the vehicle width direction. Both the motor 14 and the generator 15 are formed in a short-axis columnar shape as a whole. An axial direction of the motor 14 and the generator 15 refers to the direction toward which the rotation center axes 14a and 15a are oriented.

Figure 5:
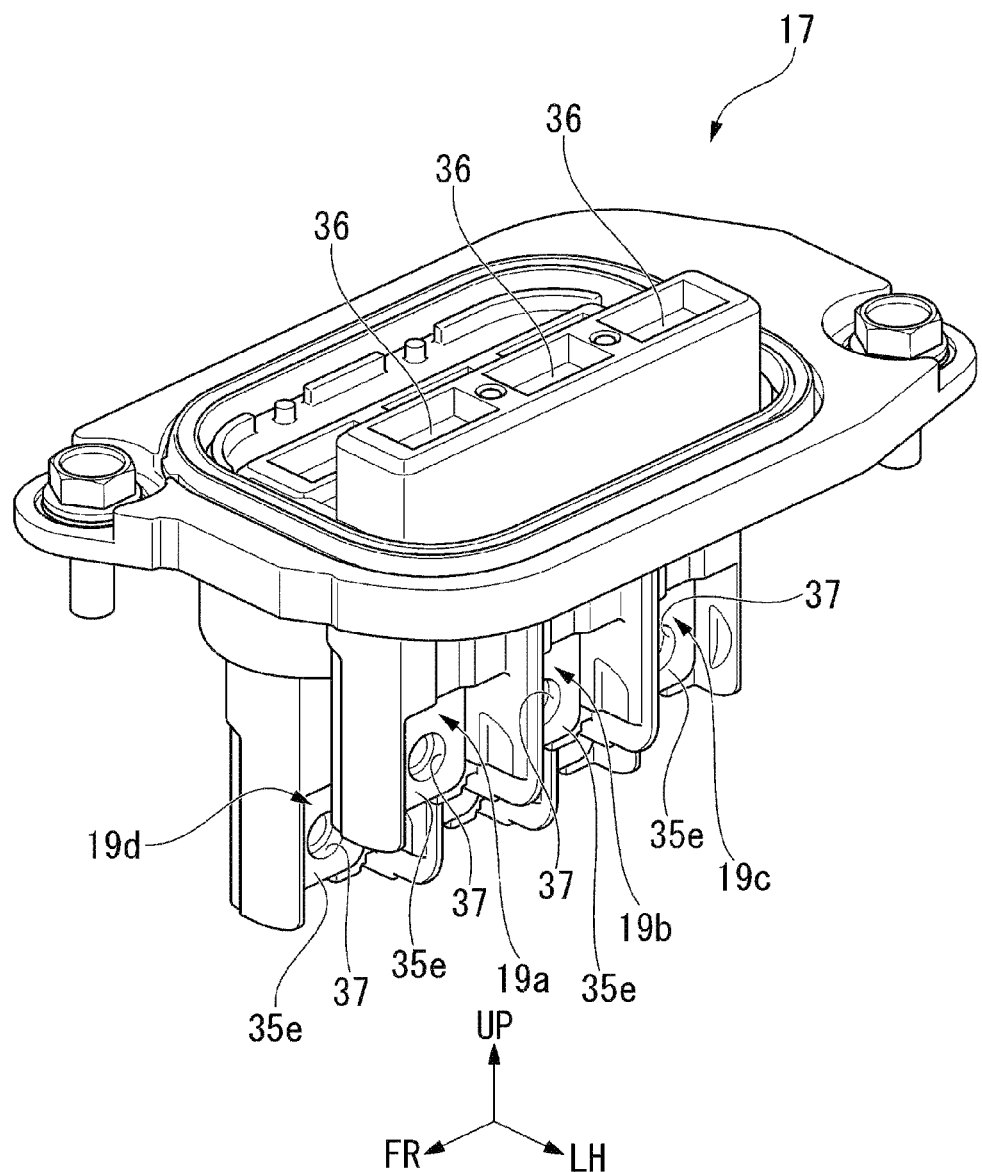
FIG. 5 is a perspective view of the connector of the embodiment.
Figure 6:
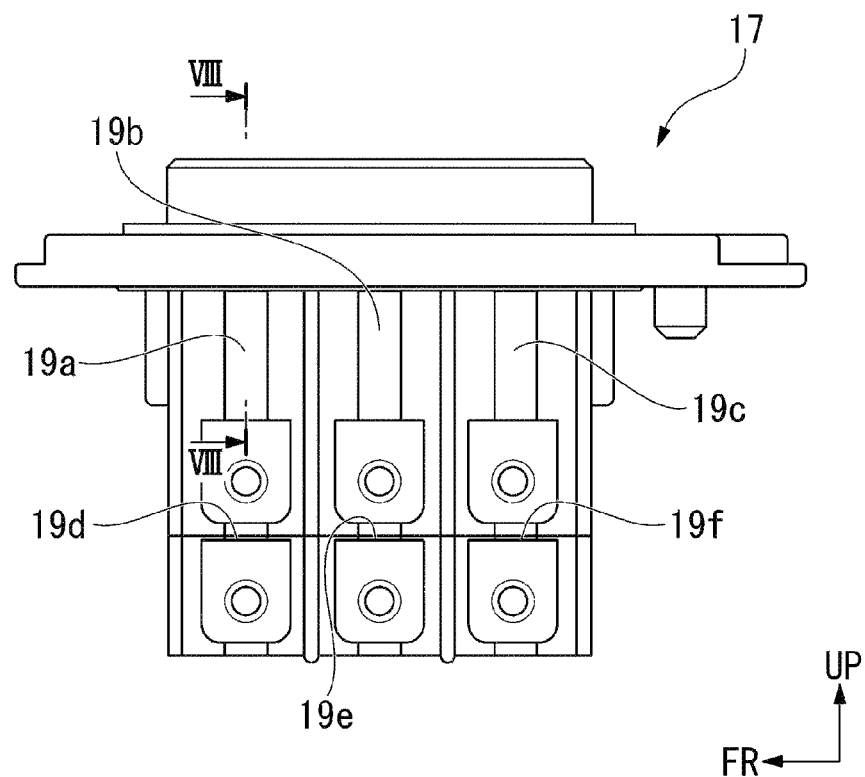
FIG. 6 is a front view of the connector of the embodiment.
Figure 7:
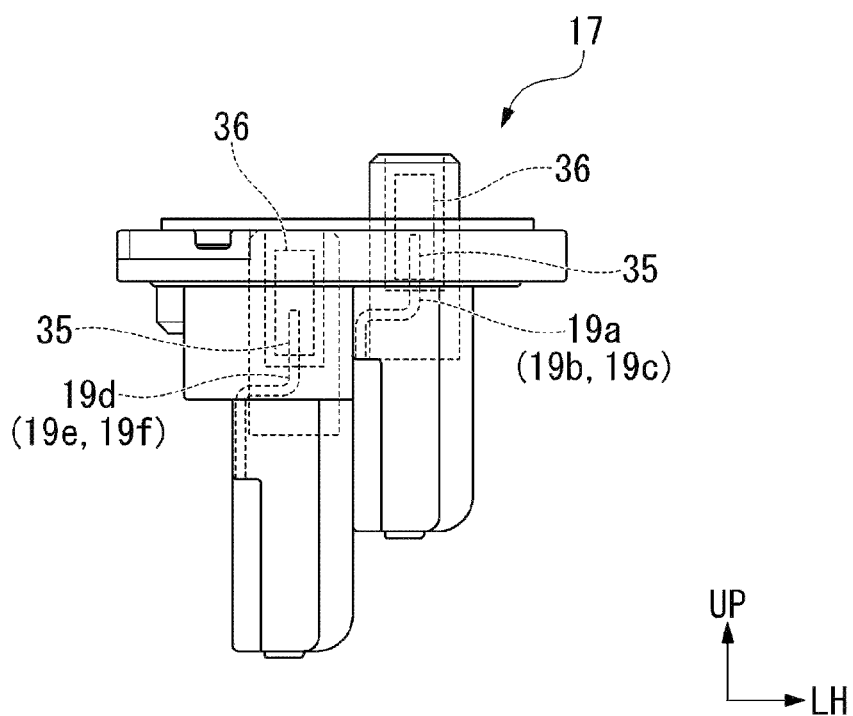
FIG. 7 is a side view of the connector of the embodiment.
Figure 8:
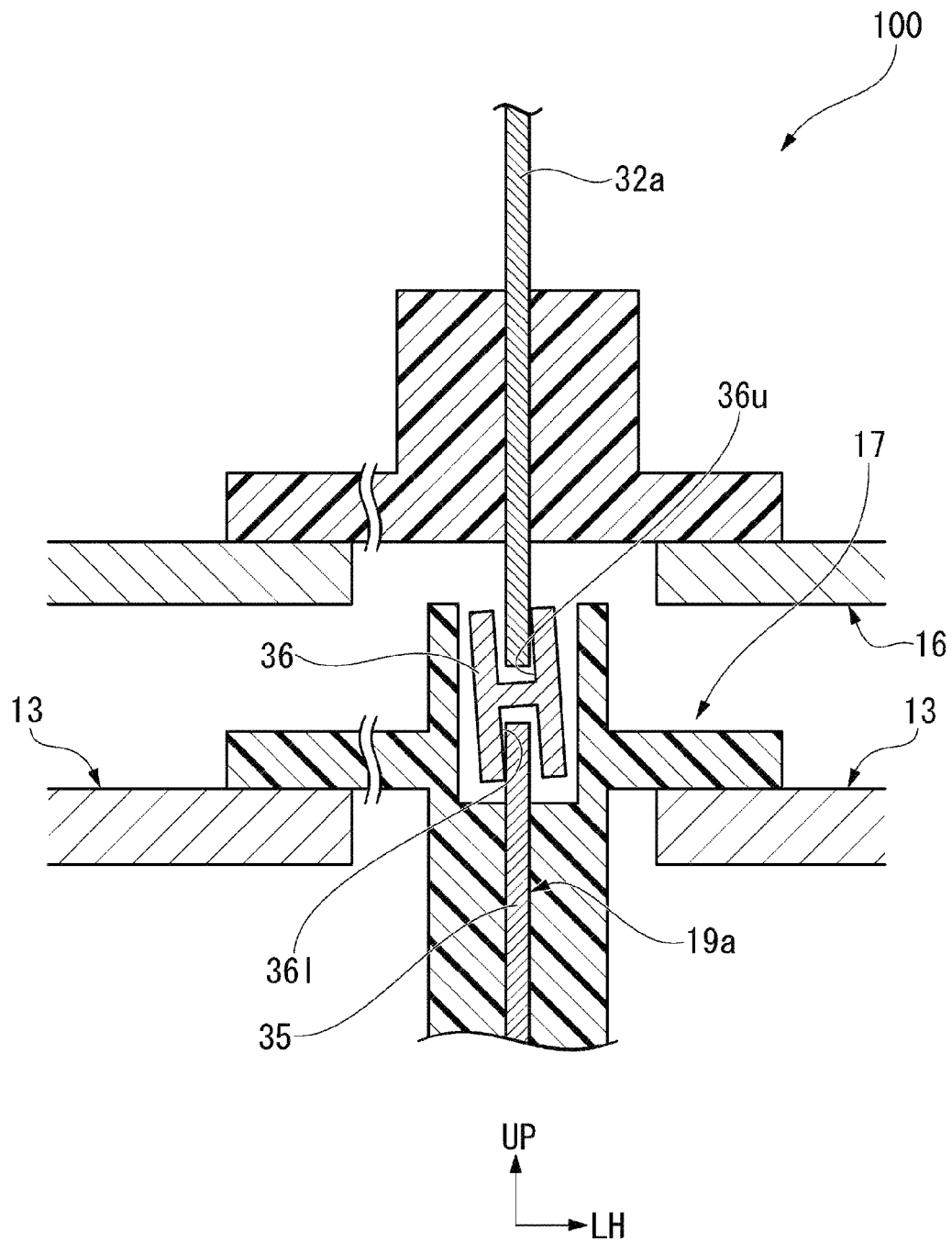
FIG. 8 is a cross-sectional view of the electric apparatus of the embodiment corresponding to a cross section taken along line VIII-VIII of FIG. 6.

FIG. 5 is a perspective view of the connector 17, and FIG. 6 is a front view of the connector 17. Further, FIG. 7 is a side view of the connector 17, and FIG. 8 is a cross-sectional view of the electric apparatus 100 corresponding to a cross section along line VIII-VIII of FIG. 6.

As shown in FIG. 3 and FIG. 4, the connector 17 is attached to an upper surface near a front portion of the casing 13 of the rotating electric machine unit 11 and near the outer side in the vehicle width direction. The connector 17 holds three connecting terminals 19a, 19b, and 19c that connect energizing parts of three phases of the motor 14 in the rotating electric machine unit 11 to corresponding conductive passages 18a, 18b, and 18c (see FIG. 3) in the power drive unit 16, and holds three other connecting terminals 19d, 19e, and 19f that connect energizing parts of three phases of the generator 15 in the rotating electric machine unit 11 to corresponding conductive passages 18d, 18e, and 18f (see FIG. 3) in the power drive unit 16.

In this embodiment, the generator 15 constitutes one rotating electric machine, and the motor 14 constitutes another rotating electric machine. Further, the three connecting terminals 19a, 19b and 19c constitute another-side connecting terminals, and the other three connecting terminals 19d, 19e and 19f constitute one-side connecting terminals.

Hereinafter, the connecting terminals that connect the energizing parts of the three phases of the motor 14 to the conductive passage 18a, 18b, and 18c in the power drive unit 16 are referred to as a first connecting terminal 19a, a second connecting terminal 19b, and a third connecting terminal 19c. Further, the connecting terminals that connect the energizing parts of the three phases of the generator 15 to the conductive passages 18d, 18e, and 18f in the power drive unit 16 are referred to as a fourth connecting terminal 19d, a fifth connecting terminal 19e, and a sixth connecting terminal 19f.

Therefore, the first to third connecting terminals 19a, 19b, and 19c constitute the another-side connecting terminals, and the fourth to sixth connecting terminals 19d, 19e, 19f constitute the one-side connecting terminals.

Herein, as shown in FIG. 3, a DC-AC converter 30A (a motor inverter) for the motor 14 and a DC-AC converter 30B (a generator inverter) for the generator 15 are arranged in the power drive unit 16. Conductive terminals 31a, 31b, and 31c of three phases of the DC-AC converter 30A for the motor 14 are connected to the first to third connecting terminals 19a, 19b, and 19c (the another-side connecting terminals) of the connector 17 via busbars 32a, 32b, and 32c to be described later. The conductive passages 18a, 18b, and 18c in the power drive unit 16 are composed of the conductive terminals and the busbars. Conductive terminals 31d, 31e, and 31f of three phases of the DC-AC converter 30B for the generator 15 are connected to the fourth to sixth connecting terminals 19d, 19e, and 19f (the one-side connecting terminals) of the connector 17 via busbars 32d, 32e, and 32f to be described later. The conductive passages 18d, 18e, and 18f in the power drive unit 16 are composed of the conductive terminals and the busbars.

The DC-AC converter 30A for the motor 14 and the DC-AC converter 30B for the generator 15 are arranged side by side in the front-rear direction of the vehicle body inside the power drive unit 16. Specifically, the DC-AC converter 30A for the motor 14 is arranged on a rear side of the DC-AC converter 30B for the generator 15. The conductive terminals 31a, 31b, 31c, 31d, 31e and 31f of the two DC-AC converters 30A and 30B are arranged side by side in a row in a front-rear direction (a direction intersecting the axial direction) on outer side end surfaces of the DC-AC converters 30A and 30B in the vehicle width direction.

As shown in FIG. 8, the first to sixth connecting terminals 19a to 19f each include a terminal base part 35 composed of a strip-shaped metal plate and a floating terminal piece 36 slidably attached to an upper-end part of the terminal base part 35. The terminal base part 35 is held by the connector 17 in a manner that its longitudinal direction is oriented toward an up-down direction. The floating terminal piece 36 has a substantially H-shaped cross section, and has an upper fitting groove 36u that opens upward and a lower fitting groove 36l that opens downward. The corresponding busbars 32a to 32f on the power drive unit 16 side may be fitted into the upper fitting grooves 36u. Upper-end parts of the corresponding terminal base parts 35 are fitted into the lower fitting grooves 36l. By adjusting a fitting depth of the corresponding busbars 32a to 32f into the upper fitting groove 36u, the floating terminal piece 36 can absorb an error of each component at the time of assembling the rotating electric machine unit 11 and the power drive unit 16.

In this embodiment, the floating terminal piece 36 constitutes an upper-end side connecting part in the connecting terminal. Further, a lower-end region 35e of the terminal base part 35 constitutes a lower-end side connecting part in the connecting terminal. A connection hole 37 into which a screw (not shown) for wiring connection is tightened is formed in the lower-end region 35e of the terminal base part 35. Wirings 38a, 38b, 38c, 38d, 38e, and 38f for energizing the motor 14 and the generator 15 are connected to the lower-end regions 35e of the terminal base parts 35.

The fourth to sixth connecting terminals 19d, 19e, and 19f held by the connector 17 are arranged side by side in a row at positions directly below the conductive terminals 31d, 31e, and 31f of the three phases of the DC-AC converter 30B. In contrast, the first to third connecting terminals 19a, 19b, and 19c held by the connector 17 are arranged to offset to a side away from the fourth to sixth connecting terminals 19d, 19e, and 19f to the outer side in the vehicle width direction. The first to third connecting terminals 19a, 19b, and 19c and the fourth to sixth connecting terminals 19d, 19e, and 19f are arranged to substantially overlap in the vehicle width direction.

Further, the upper-end side connecting parts (the floating terminal pieces 36) of the fourth to sixth connecting terminals 19d, 19e, and 19f are set to be lower than the upper-end side connecting parts (the floating terminal pieces 36) of the first to third connecting terminals 19a, 19b, and 19c. The upper-end side connecting parts (the floating terminal pieces 36) of the fourth to sixth connecting terminals 19d, 19e, and 19f are connected to the corresponding conductive terminals 31d, 31e, and 31f of the DC-AC converter 30B directly above via the rectangular plate-shaped busbars 32d, 32e, and 32f extending in the up-down direction.

In contrast, the upper-end side connecting parts (the floating terminal pieces 36) of the first to third connecting terminals 19a, 19b, and 19c are connected to the corresponding conductive terminals 31a, 31b, and 31c of the DC-AC converter 30A above the motor 14 via the busbars 32a, 32b, and 32c having extension parts extending along an arrangement direction of the conductive terminals 31a to 31f.

Further, the lower-end side connecting parts (the lower-end regions 35e) of the fourth to sixth connecting terminals 19d, 19e, and 19f protrude further downward than the lower-end side connecting parts (the lower-end regions 35e) of the first to third connecting terminals 19a, 19b, and 19c. Therefore, when viewed from a direction along the axial direction of the motor 14, the lower-end side connecting parts (the lower-end regions 35e) of the connecting terminals on the front side do not overlap with the lower-end side connecting parts (the lower-end regions 35e) of the connecting terminals on the back side.

Effect of Embodiment

As described above, in the electric apparatus 100 of this embodiment, since the fourth to sixth connecting terminals 19d, 19e, and 19f held by the connector 17 are arranged to offset in the axial direction with respect to the first to third connecting terminals 19a, 19b, and 19c, it is possible to prevent the connector 17 from becoming long in one direction. Therefore, the arrangement position of the connector 17 can be sufficiently lowered while avoiding interference between the connector 17 including the connecting terminals and an outer peripheral portion of the motor 14. In other words, by arranging the connector 17 at a position shifted in the front-rear direction from the top portion of the motor 14, the arrangement position of the connector 17 can be sufficiently lowered, and the height dimension of the electric apparatus 100 can be reduced.

In addition, in the electric apparatus 100 of this embodiment, the upper-end side connecting parts (the floating terminal pieces 36) of the fourth to sixth connecting terminals 19d, 19e, and 19f held by the connector 17 are set to be lower than the upper-end side connecting parts (the floating terminal pieces 36) of the first to third connecting terminals 19a, 19b, and 19c, and are connected to the corresponding conductive terminals 31d, 31e, and 31f substantially directly above via the busbars 32d, 32e, and 32f extending in the up-down direction. Therefore, part of the connector 17 can be arranged to be wrapped under the one of the DC-AC converters (i.e., the DC-AC converter 30B) of the power drive unit 16. Accordingly, it is possible to prevent the connector 17 from protruding significantly to the outer side in the vehicle width direction of the DC-AC converter 30B.

Accordingly, when the electric apparatus 100 of this embodiment is adopted, the dimensions of the electric apparatus 100 in the up-down direction and the vehicle width direction can be reduced, and the outer shape of the electric apparatus 100 can be miniaturized.

Further, in the electric apparatus 100 of this embodiment, the lower-end regions 35e of the fourth to sixth connecting terminals 19d, 19e, and 19f protrude further downward than the lower-end regions 35e of the first to third connecting terminals 19a, 19b, and 19c, and the connection holes 37 facing a same direction are respectively formed in the lower-end regions 35e. Therefore, the wirings 38a, 38b, 38c, 38d, 38e, and 38f can be easily connected to the lower ends of the respective connecting terminals from the same direction.

The disclosure is not limited to the above embodiment, and various design changes may be made without departing from the gist thereof.

What is claimed is:

1. An electric apparatus comprising:
   a rotating electric machine unit in which two rotating electric machines having energizing parts of three phases are housed in a casing;
   a power drive unit that has DC-AC converters of two systems corresponding to the two rotating electric machines and is connected to an upper part of the casing;
   three one-side connecting terminals that conduct the energizing parts of the three phases of one of the rotating electric machines with corresponding conductive terminals of one of the DC-AC converters;
   three another-side connecting terminals that conduct the energizing parts of the three phases of another of the rotating electric machines with corresponding conductive terminals of another of the DC-AC converters; and
   a connector that holds the one-side connecting terminals and the another-side connecting terminals and is attached to the upper part of the casing, wherein the conductive terminals of three phases of the one of the DC-AC converters and the conductive terminals of three phases of the another of the DC-AC converters are arranged side by side in a row in a direction intersecting an axial direction of the rotating electric machines,
   wherein the three one-side connecting terminals held by the connector are arranged side by side in a row at positions substantially directly below the conductive terminals of the three phases of the one of the DC-AC converters,
   the three another-side connecting terminals held by the connector are arranged side by side in a row at positions offset to a side away from the one-side connecting terminals in the axial direction,
   upper-end side connecting parts of the three one-side connecting terminals are set to be lower than upper-end side connecting parts of the three another-side connecting terminals, and are connected to the corresponding conductive terminals above via busbars that extend in an up-down direction, and
   the upper-end side connecting parts of the three another-side connecting terminals are connected to the corresponding conductive terminals via busbars that extend along an arrangement direction of the conductive terminals.

2. The electric apparatus according to claim 1, wherein lower-end side connecting parts of the three one-side connecting terminals protrude further downward than lower-end side connecting parts of the three another-side connecting terminals, and
   connection holes facing a same direction are formed at the respective lower-end side connecting parts of the one-side connecting terminals and the another-side connecting terminals.

* * * * *